May 5, 1925.
A. IDE
1,536,181
CHANGEABLE SPEED GEAR TRANSMISSION
Filed May 23, 1924
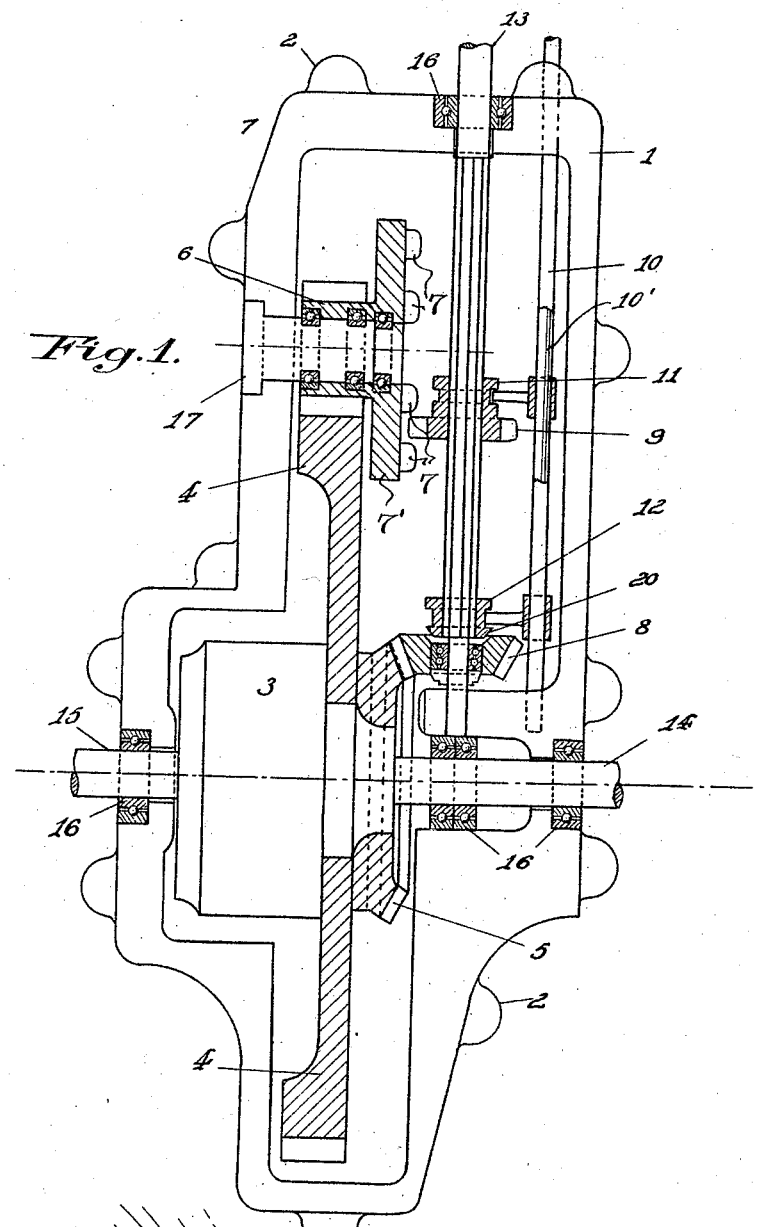
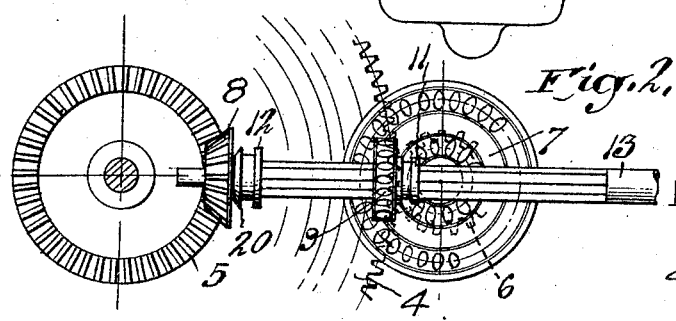
INVENTOR:
André Ide
ATTORNEY.

Patented May 5, 1925.

1,536,181

UNITED STATES PATENT OFFICE.

ANDRÉ IDE, OF ANTWERP, BELGIUM.

CHANGEABLE-SPEED-GEAR TRANSMISSION.

Application filed May 23, 1924. Serial No. 715,424.

*To all whom it may concern:*

Be it known that I, ANDRÉ IDE, a subject of the King of the Belgians, and resident of 34 Avenue Marie, Antwerp, Belgium, have invented certain new and useful Improvements in Changeable-Speed-Gear Transmissions, of which the following is a specification.

My present invention relates to improvements in changeable speed gear transmissions.

One of the objects of my invention is to provide a transmission gear of this class which is very simple in construction and comprises only a very little number of gear wheels, at the same time being capable of producing two, three or more speeds according to requirements.

A further object of my invention is to reduce the consumption of motive power absorbed by the transmission gear, by the use of a fly-wheel as gear-wheel which imparts inertia forces to all the members in the changeable gear speed casing or the differential gear, so as to considerably relieve the ball bearings thereof.

The changeable speed gear transmission is illustrated diagrammatically in the accompanying drawings, wherein:

Fig. 1 is a horizontal section of the device on a plane passing through the rear wheel-axle.

Fig. 2 is an elevation of the gear-wheels.

The gear is entirely enclosed within a casing 1, formed of two parts assembled by means of flanges 2. Said casing contains the differential gear 3 which may be of any known construction and mounted on the section 15 of the rear wheel-axle 14—15. Therefore said casing 1 will be mounted on both sections 14—15 of the rear wheel-axle by means of ball-bearings 16. The casing of the differential gear is made integral with a combined spur-wheel and fly-wheel 4, the free face of which is provided with a bevel gear wheel 5, made also integral with the fly-wheel 4 and the casing 3 of the differential gear. The combined spur-wheel and fly-wheel 4 meshes continuously with a small gear-wheel 6 decreasing the ratio of transmissions and loosely mounted on a shaft 17 held in the wall of the casing 1. The shaft 17 is provided with a disc 7' having concentric sets of teeth 7. The disc 7' and gear wheel 6 are connected for unit movement and both are supported on the shaft through appropriate ball bearings.

The use of a combined spur-wheel and fly-wheel such as 4 which serves at the same time as a gear-wheel is very important and constitutes one of the characteristic features of my invention. In fact said fly-wheel imparts inertia forces to all the members of the changeable speed gear transmission and differential gear, whereby the bearings will be considerably relieved and the engine allowed to run more regularly and consume less fuel.

The drive-shaft 13 extends into the casing 1 and is journaled in ball bearings at suitable points. At its end the drive shaft 13 carries a bevel gear wheel 8, loosely mounted on said shaft by means of ball bearings and meshing continuously with the bevel gear-wheel 5. The drive shaft 13 is made hexagonal in cross section on the section lying within the casing 1 and a spur wheel 9 is mounted on the hexagonal portion of the drive shaft 13 in position to be moved to selectively cooperate with either set of teeth 7 on the disc 7'. The bevel gear-wheel 8 may be driven by the drive shaft 13 through the agency of a friction clutch 20, fast on the hexagonal portion and a friction cone and the spur-wheel 9 may be moved longitudinally by means of slidable sleeves 11 and 12 actuated by shifting rods 10 and 10' extending to the operator's hand lever. A simple gear having a lever integral with said hand lever enables the operator to control both shifting rods 10 and 10' simultaneously in one operation, so that the bevel gear-wheel 8 may be thrown out of engagement when the spur-wheel 9 meshes with either of the concentric toothings on the discs 7 and vice versa when the bevel gear-wheel 8 is engaged by the clutch and actuated by the shaft 13, the spur-wheel 9 will be out of mesh and inoperative between the different concentric toothings on disc 7.

In the embodiment illustrated in the drawings, I have shown by way of example a changeable speed gear transmission designed for three different rates of speed. If the spur-wheel 9 is not in mesh with either concentric gear-wheel on disc 7 and the bevel gear-wheel 8 actuated by its clutch, the movement will be transmitted directly from the drive-shaft to the rear wheel axle through the agency of the bevel gear wheel 5 and the differential gear 3. If the clutch 20 is disengaged from the bevel gear wheel 8 and the spur-wheel 9 meshes with either of the concentric gear-wheels on disc 7, the movement will be transmitted with a lower ratio of transmission owing to the ratio between said spur-wheel 9 and the concentric gear-wheel on disc 7, the low speed gear 6 and the toothed fly-wheel 4, and it will be understood that the number of concentric gear-wheels on disc 7 constitutes as many possible rates of speed.

It is obvious that ball bearings 16 will be provided at any required point and the shifting of the clutch 20 of the bevel gear wheel 8 or the slidable sleeve 11 for the spur-wheel 9 may be effected by any suitable means.

As will be understood my improved changeable speed gear transmission of simple and strong construction having only a few machined parts and applicable to any motor vehicle for any desired number of speeds. The casing 1 will be provided with an oil-well for the lubrication of the various parts, and for the purpose of avoiding noise the teeth of the gear wheel will be cut obliquely whereby jerks will be avoided.

It is obvious that my present changeable speed gear transmission also enables the car to be driven backwardly. To this end it will be sufficient to disengage the clutch 20 from the bevel pinion 8 and throw the spur-wheel 9 into mesh preferably with the gear wheel on disc 7 which is the nearest to the centre thereof and in advance of said centre.

Having now fully described my said invention, what I claim and desire to secure by Letters Patent, is:

1. A changeable speed gear transmission for motor-cars and the like, comprising a casing, in which are mounted the ends of the rear wheel-axle shafts; a differential gear box housed within said casing and mounted on the ends of said wheel-axle shafts, a spur-gear wheel integral with said box, a bevel gear-wheel made integral with said spur-gear-wheel, a drive-shaft of angular cross section journaled within said casing, a journal of circular cross section at the end of said shaft located within the casing, a bevel pinion loosely mounted on said journal and meshing with the bevel-gear wheel made integral with the spur gear wheel, a suitable friction clutch slidably mounted on the drive-shaft and serving to connect said loose bevel pinion with said drive-shaft, a suitable shifter for said clutch, a spur pinion rotatably mounted on a stud shaft secured to the casing and meshing with said spur gear wheel, a power transmission disc fixed with relation to said spur pinion and carrying a series of concentric gear wheels on its free face, a spur-pinion slidable on said drive shaft and capable of meshing with any one of said concentric gear wheels or with neither of them, a suitable shifter for moving said spur-pinion along the drive-shaft, substantially as set forth.

2. A changeable speed gear transmission for motor-cars and the like comprising a casing, the rear wheel axle shafts being journaled at one end by means of ball bearings within said casing, a differential box housed within the casing and mounted on said rear wheel axle shafts, a spur gear wheel of large diameter made integral with said box and acting as a fly-wheel for the whole gear, a bevel gear wheel made integral with said spur gear-wheel, a drive-shaft of angular cross section journaled within said casing, a journal of circular cross section at the end of said shaft located within the casing, a bevel pinion loosely mounted on said journal and meshing with the bevel-gear wheel made integral with the spur gear wheel, a suitable friction clutch slidably mounted on the drive-shaft and serving to connect said loose bevel pinion with said drive-shaft, a suitable shifter for said clutch, a spur pinion rotatably mounted on a stud shaft secured to the casing and meshing with said spur gear wheel, a power transmission disc fixed with relation to said spur pinion and carrying a series of concentric gear wheels on its free face, a spur-pinion slidable on said drive shaft and capable of meshing with any one of said concentric gear wheels or with neither of them, a suitable shifter for moving said spur-pinion along the drive-shaft, substantially as set forth.

In testimony whereof I have hereunto set my hand in presence of two witnesses.

ANDRÉ IDE.

Witnesses:
O. SCHATZ,
GEORGES DELLROUSE.